(12) United States Patent
Lumpe et al.

(10) Patent No.: US 6,592,176 B2
(45) Date of Patent: Jul. 15, 2003

(54) ROOF RAIL/ROOF MODULE

(75) Inventors: Karl-Heinz Lumpe, Sprockhovel (DE); Klaus Kolodziej, Wuppertal (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 09/966,627

(22) Filed: Sep. 28, 2001

(65) Prior Publication Data

US 2002/0047292 A1 Apr. 25, 2002

(30) Foreign Application Priority Data

Oct. 17, 2000 (DE) .......................... 100 51 512

(51) Int. Cl.[7] ............................... B60R 9/04
(52) U.S. Cl. .................. 296/210; 296/205; 224/309; 224/326
(58) Field of Search ............... 296/210, 37.7, 296/216.09, 203.01, 205, 203.03; 224/309, 322, 325, 326

(56) References Cited

U.S. PATENT DOCUMENTS

| | | | |
|---|---|---|---|
| 5,518,157 A | * 5/1996 | Evels et al. | 224/309 |
| 5,573,159 A | * 11/1996 | Fisch et al. | 224/309 |
| 5,617,981 A | * 4/1997 | Ricker et al. | 224/309 |
| 5,624,266 A | 4/1997 | Gibbs et al. | |
| 5,715,981 A | * 2/1998 | Blomberg et al. | 224/326 |
| 5,893,499 A | * 4/1999 | Lumpe et al. | 224/309 |
| 6,089,427 A | 7/2000 | Evels et al. | |
| 6,158,637 A | 12/2000 | Fisch et al. | |
| 6,250,528 B1 | 6/2001 | Lumpe et al. | |
| 6,267,281 B1 | 7/2001 | Nerling et al. | |

* cited by examiner

Primary Examiner—Joseph D. Pape
(74) Attorney, Agent, or Firm—Harness Dickey & Pierce P.L.C.

(57) ABSTRACT

A roof component adapted to be secured to a vehicle body which includes a pair of roof rails secured to a roof module such that the roof component forms a single piece component. The roof module, in one embodiment, includes a openings for receiving therethrough each outermost end of each roof rail. The outermost ends are secured to separate body pillars of the vehicle body. The roof rail is secured by welding, adhesives or by threaded fasteners to the roof module. The roof component thus forms a modular component of the vehicle and eliminates the need for attaching the roof rail components in a subsequent manufacturing step after the assembly of the vehicle is completed.

19 Claims, 3 Drawing Sheets

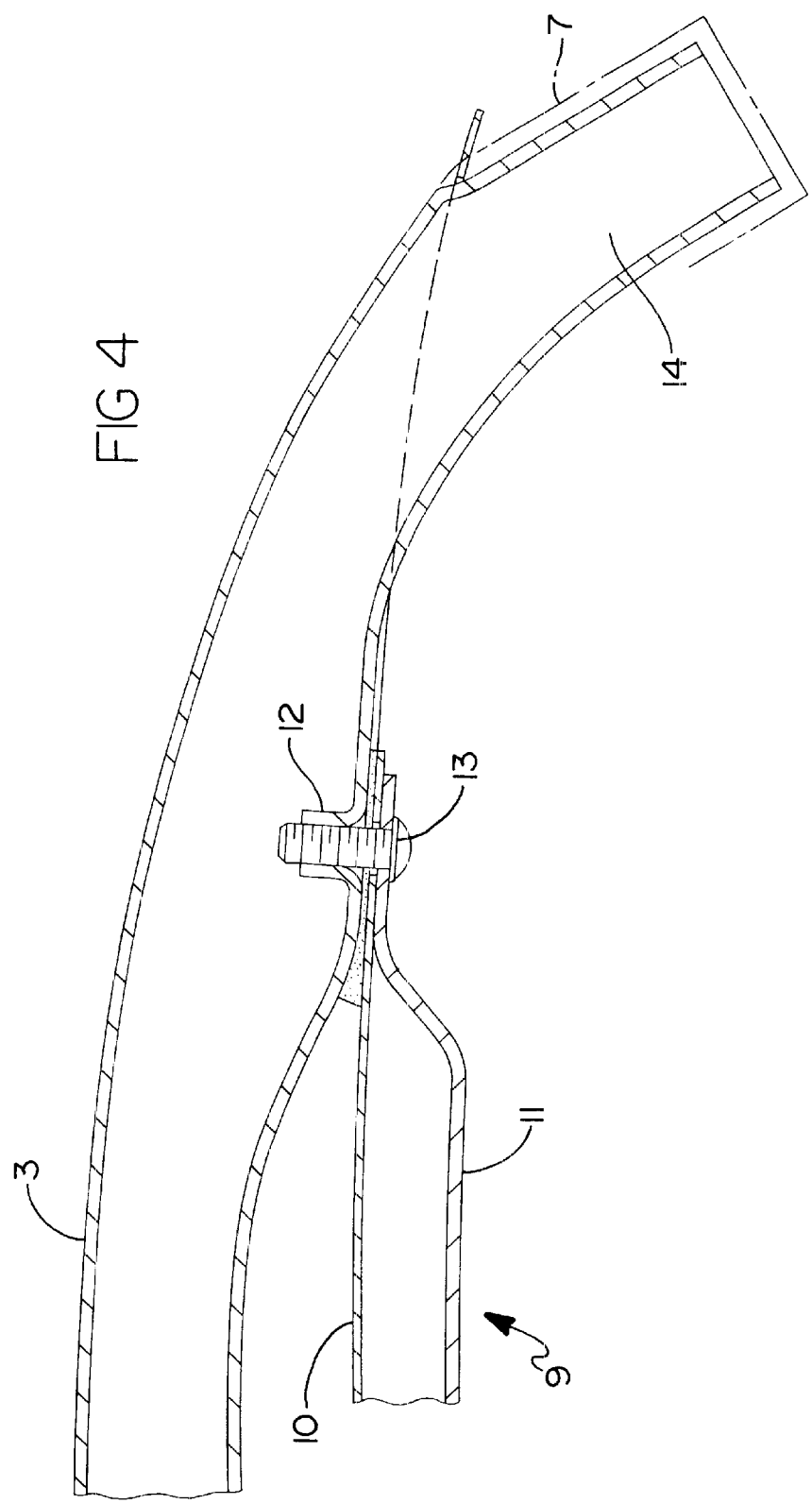

ROOF RAIL/ROOF MODULE

CROSS-REFERENCE TO RELATED APPLICATIONS

This application claims priority from German Application No. 100 51 512.6 filed Oct. 17, 2000 which is incorporated by reference herein.

FIELD OF THE INVENTION

The invention relates to a vehicle roof for passenger cars, station wagons, and similar motor vehicles.

BACKGROUND OF THE INVENTION

In the automotive industry, the conventional design of motor vehicles is being changed more and more by the use of modules. Thus, car doors, instrument panels, and even lift gates are being produced with a modular design.

It is the objective of the invention to create another modular vehicle component that simplifies the manufacture of a motor vehicle.

SUMMARY OF THE INVENTION

To solve the above-described objective in accordance with the present invention, a vehicle roof for passenger cars, station wagons, and similar motor vehicles is proposed, which is comprised of a prefabricated roof module having at least a roof outer panel and a roof liner with roof rails arranged thereon.

The particular advantage of the present invention is the ability to incorporate the roof rails into a modular vehicle roof component.

With the modular roof of the present invention, the roof rails are preferably fastened on the roof module via a fastening system comprised of gluing, soldering, welding, screwing, or riveting. This has the advantage of eliminating the expense associated with designs for balancing tolerances between a roof panel and a recess within the vehicle roof.

As a particular advantage, it can moreover be provided that the roof rails on the side wall sections of the roof module extend in an approximately parallel alignment to each other above the roof outer panel and travel through openings in the roof module with lengthened end sections that form an angle or that are bent. The end sections of the roof rails can each be fastened to front body pillars, such as A-pillars, and rear body pillars, such as D-pillars. The lengthened end sections of the roof rails can each be fastened to the body pillars by an adhesive, solder, weld, screw, or similar connection. A particular advantage of this is that each roof rail in its entirety becomes a supporting part (i.e., structural part) of a motor vehicle, which reinforces the vehicle structure from the A-pillar to the C-pillar or D-pillar for example. The forces operating on the roof rail in operation are thereby passed directly into the vehicle frame and no longer across the roof into the side panels and into the vehicle frame as with present day roof rails. Extra and expensive reinforcements in the roof frame, as required in present day vehicles, can be partially or even completely eliminated. Another advantage is that the roof rails can better cope with the forces occurring in an accident involving rollover, so that their effect has a character similar to that of a roll bar. In regard to design, the roof rails can be provided with a surface finish on the visible portions (i.e., outside the vehicle structure) and function in the same character as conventional roof rails.

Another embodiment of the invention provides a roof module wherein the roof rails each comprise at least one center post arranged thereon. Additional reinforcements can be provided on each roof rail underneath the center posts, the reinforcements then being fastened to the roof frame or to the B-pillars or C-pillars of a motor vehicle body. This results in additional stiffening of the body and even more effectively transmits forces acting on the roof rails into the vehicle body.

BRIEF DESCRIPTION OF THE DRAWINGS

The present invention will become more fully understood from the detailed description and the accompanying drawings, wherein:

FIG. 4 is a rear section view of a roof module with the roof rail as depicted in FIG. 3.

DETAILED DESCRIPTION OF THE PREFERRED EMBODIMENTS

Figure 1:
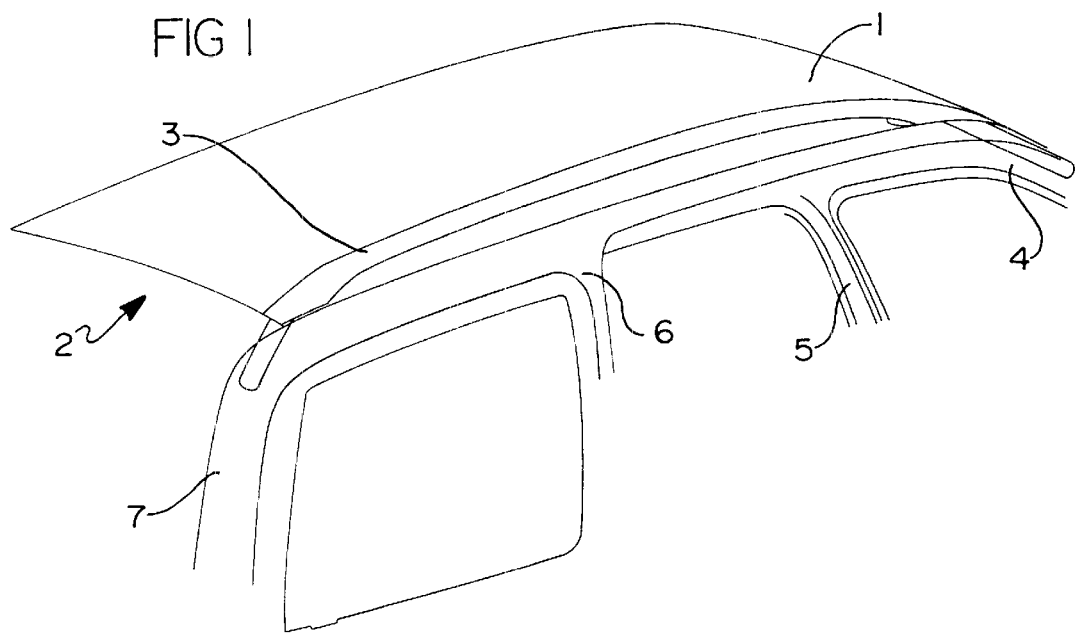
FIG. 1 is a view of a motor vehicle's roof and side panel section with a roof rail arranged on the roof.
Figure 2:
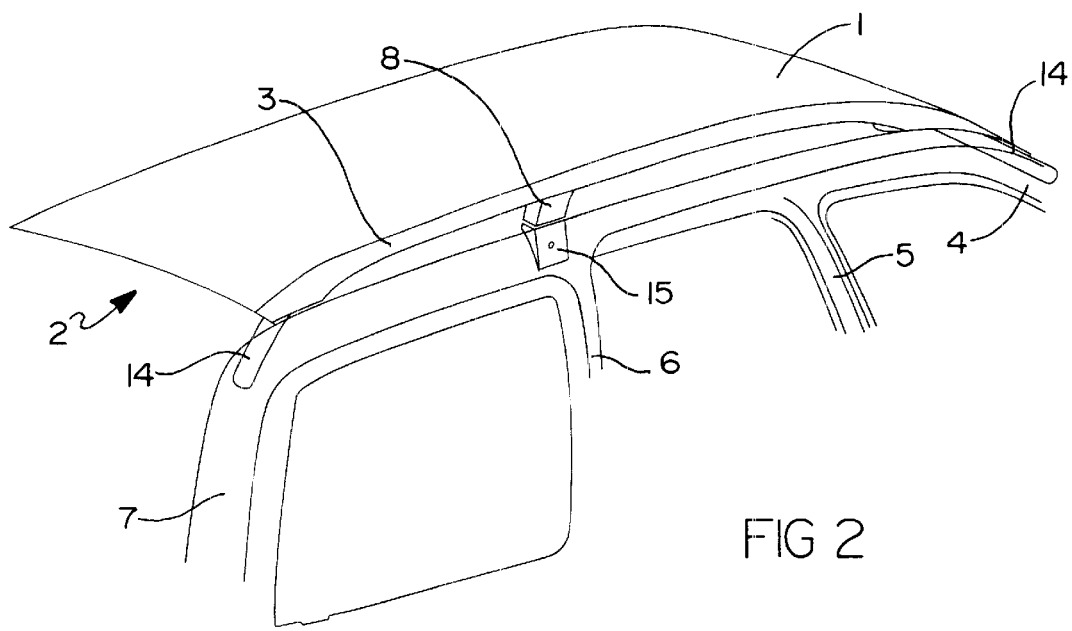
FIG. 2 is a view of a roof rail arranged on a vehicle roof with a center post.

A roof rail 3 arranged on a roof of a motor vehicle 2 and a side panel section of the motor vehicle 2 with an A-pillar 4, a B-pillar 5, a C-pillar 6, and a D-pillar 7 is shown in FIGS. 1 and 2. The roof rail 3 can feature a multipart construction, but preferably consists of one piece. The roof rail 3 shown in FIG. 2 differs from that of FIG. 1 only in that it provided with a center post 8.

Figure 3:
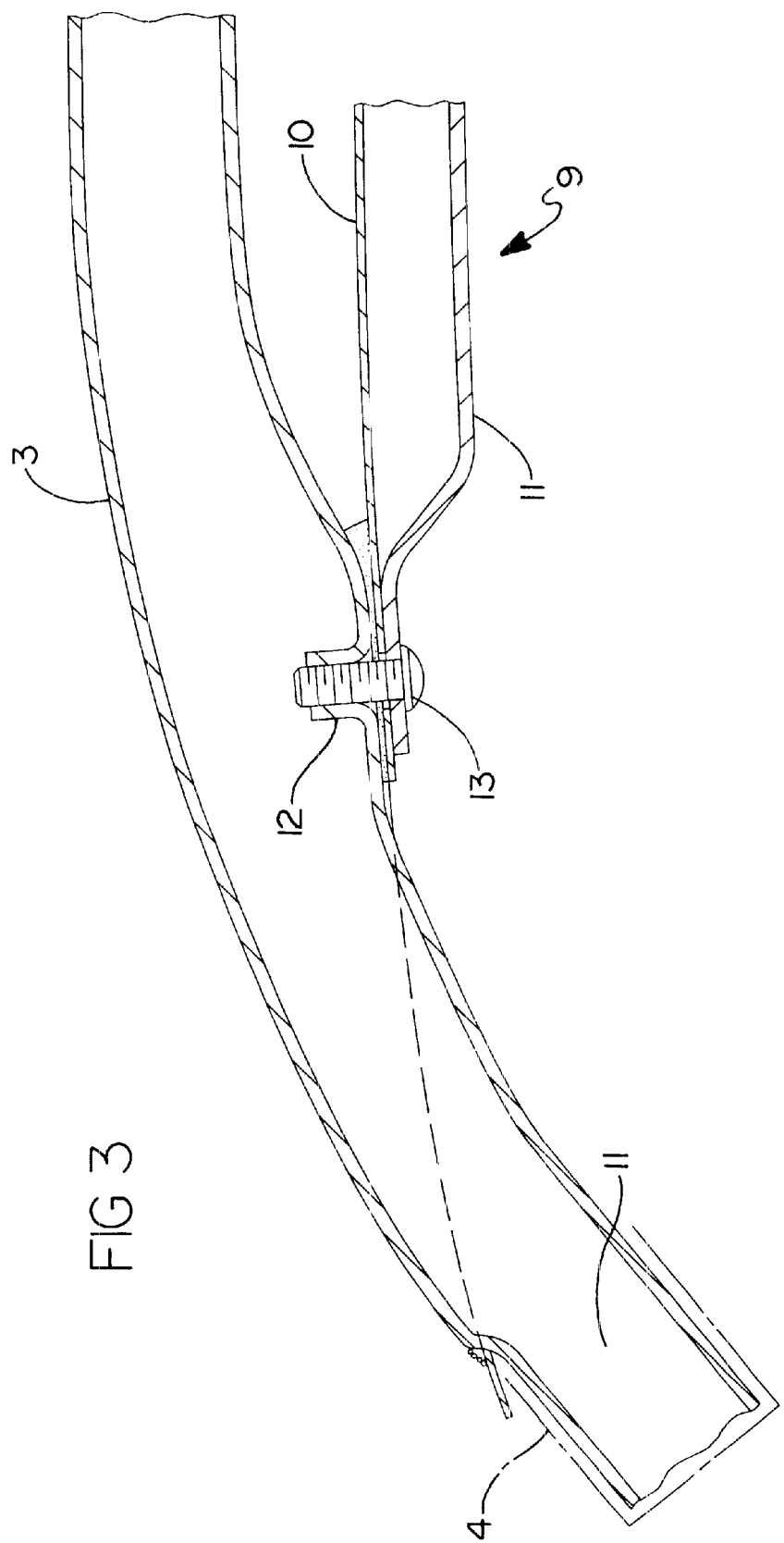
FIG. 3 is a front section view of a roof module with a roof rail.

The roof 1 depicted in FIGS. 1 and 2 consists of a roof module 9, shown in greater detail in FIGS. 3 and 4, wherein the roof module 9 includes the special feature of integrated roof rails 3, of which only one is shown in the drawings for the sake of simplicity. The roof module 9 consists of at least a roof outer panel 10 and a roof liner 11. The roof module 9 can be equipped with a sliding roof, sun roof top, or sunroof in a manner not presented here in detail, and with a wide variety of other kinds of components. But the present invention is primarily concerned with integrating roof rails into a roof module in order to create one component consisting of a roof module and two roof rails.

As shown in FIGS. 3 and 4, the roof rail 3 is fastened at its front and rear downwardly-sloping regions on roof module 9. In the illustrated example, the roof rail 3 includes threaded indentations 12 on its end sections and is fastened by bolts 13 to the outer panel 10 and roof liner 11. But a fastening arrangement built by gluing, soldering, welding or the like could also be provided. FIGS. 3 and 4 furthermore show that roof rail 3 is designed with lengthened end sections 14 and that these end sections 14 travel through the roof module 9, wherefore the roof module 9 is fitted with appropriate penetrable openings 16.

The roof 1 consisting of roof module 9 and roof rail 3 can be placed upon the vehicle frame or vehicle pillars in a conventional manner and be connected with them by welding, for example. A particular feature of the present invention is that the end sections 14 of roof rails 3 are implemented in such a manner that they can be fastened to vehicle pillars like A-pillars 4 and D-pillars 7. In the example depicted in FIGS. 3 and 4 for example, the end sections 14 of roof rail 3 are designed as plugs, one of which engages A-pillar 4, which is indicated with dots and dashes, and the other into D-pillar 7, which is indicated with dots and dashes. The end sections 14 can again each be fastened to the A-pillars 4 or D-pillars 7 by adhesive, soldering, welding, with screws, or by similar forms of connection.

Extra reinforcements (FIG. 2 indicates a reinforcement 15) can be provided in the roof module 9 under the center posts 8 and then fastened to the roof frame or to the B-pillars 5 and/or C-pillars 6.

Each roof rail 3 can consist of one boom 3a and end feet and sustainers attached thereto. Preferred, however, is a roof rail that consists of a single section of a metal tube and is designed as a single piece component. Each roof rail is further formed as a materially uniform component having the end supports or extensions 14, and possibly with a center post 8. Preferably the roof rails 3 are each formed by applying a shaping process using internal high pressure to the metal tubes which eventually form each roof rail 3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle roof adapted to be secured to a vehicle body of a motor vehicle, the vehicle roof comprising:
    a roof module having a roof liner and at least one opening formed therein;
    at least one elongated roof rail having a pair of outermost ends;
    wherein at least one of said outermost ends is adapted to extend through said at least one opening and is secured to a body pillar of said vehicle body; and
    wherein said roof module is adapted to be secured to said vehicle body.

2. The vehicle roof of claim 1, wherein each of said outermost ends of said at least one elongated roof rail extend through openings in said roof module and are secured to separate body pillars of said vehicle body.

3. The vehicle roof of claim 1, wherein said at least one elongated roof rail comprises a center support post which is secured to said roof module.

4. The vehicle roof of claim 3, wherein said center support post is adapted to be secured to a body pillar of said vehicle body when said roof module is secured to said vehicle body.

5. The vehicle roof of claim 3, wherein said at least one elongated roof rail includes a pair of roof rails secured to said roof module.

6. The vehicle roof of claim 1, wherein said at least one elongated roof rail is secured by welding to said roof module.

7. The vehicle roof of claim 1, wherein said at least one elongated roof rail is secured by an adhesive to said roof module.

8. The vehicle roof of claim 1, wherein said at least one elongated roof rail is secured by at least one threaded fastener to said roof module.

9. The vehicle roof of claim 1, wherein said roof module further comprises a roof outer panel.

10. A vehicle roof adapted to be secured to a vehicle body of a motor vehicle, the vehicle roof comprising:
    a roof module having at least one opening formed therein;
    at least one elongated roof rail having a pair of outermost ends secured to the roof module;
    wherein at least one of said outermost ends of said at least one elongated roof rail is adapted to extend through said one opening and to be secured to an existing body pillar of said vehicle body; and
    wherein the roof module is adapted to be secured to said vehicle body.

11. The vehicle roof of claim 10, wherein said at least one elongated roof rail further includes a center support post for supporting said at least one elongated roof rail at an intermediate point along a length thereof.

12. A The vehicle roof of claim 10, wherein said roof module includes a pair of openings, and wherein each of said outermost ends of said at least one elongated roof rail extend through an associated one of said openings and are adapted to be secured to separate body pillars of said vehicle body.

13. The vehicle roof of claim 10, wherein said roof module comprises a roof outer panel and a roof liner.

14. The vehicle roof of claim 10, wherein said at least one elongated roof rail includes at least one indentation having a threaded opening for enabling said at least one elongated roof rail to be secured via a threaded fastening element to said roof module.

15. The vehicle roof of claim 10, wherein said at least one elongated roof rail is secured to said roof module by one of the group consisting of welding, adhesives and threaded fasteners.

16. A vehicle roof adapted to be secured to a vehicle body of a motor vehicle, the vehicle roof comprising:
    a roof module having at least a pair of spaced apart openings formed therein;
    at least one elongated roof rail secured to the roof module and having a pair of outermost ends extending through the spaced apart openings;
    wherein said outermost ends of said at least one elongated roof rail are adapted to extend through said openings and to be secured to a pair of existing body pillars of said vehicle body; and
    wherein the roof module with said at least one elongated roof rail secured thereto is adapted to be placed on said vehicle body and secured to said vehicle body as a single piece component.

17. The vehicle roof of claim 16, wherein said at least one elongated roof rail further comprises a center support for supporting said at least one elongated roof rail at an intermediate point along a length thereof.

18. The vehicle roof of claim 16, wherein said roof module comprises a roof panel and a roof liner disposed generally parallel to one another.

19. The vehicle roof of claim 16, wherein said at least one elongated roof rail includes at least one indentation having a threaded portion for enabling said roof rail to be secured to said at least one elongated roof module via at least one threaded fastener.

* * * * *